(12) United States Patent
Ono et al.

(10) Patent No.: US 11,894,768 B2
(45) Date of Patent: Feb. 6, 2024

(54) DC/DC CONVERTER

(71) Applicant: SONY SEMICONDUCTOR SOLUTIONS CORPORATION, Kanagawa (JP)

(72) Inventors: Kazutoshi Ono, Kanagawa (JP); Nobuhiko Shigyo, Kanagawa (JP); Hideo Maeda, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 17/996,409

(22) PCT Filed: Mar. 10, 2021

(86) PCT No.: PCT/JP2021/009449
§ 371 (c)(1),
(2) Date: Oct. 17, 2022

(87) PCT Pub. No.: WO2021/220629
PCT Pub. Date: Nov. 4, 2021

(65) Prior Publication Data
US 2023/0216400 A1   Jul. 6, 2023

(30) Foreign Application Priority Data

Apr. 27, 2020   (JP) .................................. 2020-077926

(51) Int. Cl.
*H02M 3/07* (2006.01)
*G05F 3/20* (2006.01)

(52) U.S. Cl.
CPC ............ *H02M 3/073* (2013.01); *G05F 3/205* (2013.01); *H02M 3/072* (2021.05)

(58) Field of Classification Search
None
See application file for complete search history.

(56) References Cited

U.S. PATENT DOCUMENTS

| 4,581,545 A | * | 4/1986 | Beale | ................... | H03K 3/3565 |
| | | | | | 327/206 |
| 6,906,568 B2 | * | 6/2005 | Lin | ...................... | H03K 3/0377 |
| | | | | | 327/539 |

(Continued)

FOREIGN PATENT DOCUMENTS

| JP | 2002-051538 A | 2/2002 |
| WO | 2013/128806 A1 | 9/2013 |

OTHER PUBLICATIONS

International Search Report and Written Opinion of PCT Application No. PCT/JP2021/009449, dated May 18, 2021, 08 pages of ISRWO.

(Continued)

*Primary Examiner* — Thomas J. Hiltunen
(74) *Attorney, Agent, or Firm* — CHIP LAW GROUP

(57) ABSTRACT

When a bias voltage of a substrate is generated, an output voltage of a charge pump is controlled at an appropriate level, resultingly reducing a consumption current. The charge pump generates a predetermined output voltage from a predetermined DC power supply. A clock generator outputs a clock for operating the charge pump. A voltage monitoring unit monitors the output voltage of the charge pump and controls the clock output from the clock generator such that the output voltage is maintained within a predetermined range. A voltage regulator generates the bias voltage from the output voltage of the charge pump.

5 Claims, 10 Drawing Sheets

(56) References Cited

U.S. PATENT DOCUMENTS

| | | | | |
|---|---|---|---|---|
| 6,957,278 B1* | 10/2005 | Gallagher | .............. | H03K 5/084 |
| | | | | 327/66 |
| 7,116,156 B2* | 10/2006 | Myono | ................ | H02M 3/073 |
| | | | | 327/536 |
| 7,495,471 B2* | 2/2009 | Perisetty | .............. | H03K 19/173 |
| | | | | 326/38 |
| 7,692,477 B1* | 4/2010 | Chen | ....................... | G05F 3/205 |
| | | | | 327/540 |
| 8,373,695 B2* | 2/2013 | Kawagoshi | .......... | G09G 3/3696 |
| | | | | 345/212 |
| 10,061,339 B1 | 8/2018 | Vilas Boas et al. | | |
| 10,498,215 B1* | 12/2019 | Tang | .................... | H02M 3/158 |
| 2006/0226890 A1 | 10/2006 | Dadashev | | |
| 2013/0328597 A1* | 12/2013 | Cassia | .................... | H02M 3/07 |
| | | | | 327/299 |

OTHER PUBLICATIONS

Jacquet, et al., "A 3 GHZ Dual Core Processor ARM Cortex TM-A9 in 28 nm UTBB FD-SOI CMOS With Ultra-Wide Voltage Range and Energy Efficiency Optimization", IEEE, Journal of Solid-State Circuits, vol. 49, No. 4, Apr. 2014, pp. 812-826.

* cited by examiner

DC/DC CONVERTER

CROSS REFERENCE TO RELATED APPLICATIONS

This application is a U.S. National Phase of International Patent Application No. PCT/JP2021/009449 filed on Mar. 10, 2021, which claims priority benefit of Japanese Patent Application No. JP 2020-077926 filed in the Japan Patent Office on Apr. 27, 2020. Each of the above-referenced applications is hereby incorporated herein by reference in its entirety.

TECHNICAL FIELD

The present technology relates to a DC/DC converter. Specifically, the present technology relates to a DC/DC converter that generates an arbitrary power supply from a DC power supply and supplies an arbitrary potential to a biased circuit.

BACKGROUND ART

As a technique for manufacturing a complementary metal oxide semiconductor (CMOS) transistor, a fully-depleted silicon on insulator (FD-SOI) process has been gathered attention. In the FD-SOI process, a channel layer, a source as well as a drain, and a substrate are separated by a buried oxide (BOX) layer, and there is no parasitic diode between the source as well as the drain and the substrate. Therefore, it is not necessary to consider forward leakage, and for example, the source of an N-channel transistor can be set to 0 V, a potential of −1.3 V or the like can be applied to the substrate, and threshold potential of the transistor can be adjusted aggressively. In other words, the FD-SOI process has a degree of freedom in the voltage applied to the substrate, and it is possible to achieve both low leakage and high-speed operation by dynamically adjusting the voltage, and as a result, it is possible to reduce power of the entire chip. At this time, a body bias generator is used to bias a substrate (body) voltage. As the body bias generator for the CMOS transistor of such an FD-SOI process, a circuit configuration using a charge pump has been proposed (refer to, for example, Non Patent Document 1).

CITATION LIST

Non Patent Document

Non Patent Document 1: David Jacquet, et. al: "A 3 GHz Dual Core Processor ARM Cortex™-A9 in 28 nm UTBB FD-SOI CMOS With Ultra-Wide Voltage Range and Energy Efficiency Optimization", IEEE Journal of Solid-State Circuits, VOL. 49, NO. 4, 2014.

SUMMARY OF THE INVENTION

Problems to be Solved by the Invention

In the prior art described above, a 1.8 V power supply and a charge pump are used to generate a −1.8 V negative power supply, and a negative potential is supplied to an N-channel substrate via a regulator. However, in the prior art described above, since inversion voltage of the 1.8 V power supply is set as output potential of the charge pump and charge transfer amount is small, there is a problem that pumping frequency increases and consumption current increases.

The present technology has been made in view of such a situation, and an object thereof is to reduce the consumption current by controlling an output voltage of a charge pump to an appropriate level when generating a bias voltage of the substrate.

Solutions to Problems

The present technology has been made to solve the problems described above, and a first aspect thereof is a DC/DC converter including: a charge pump that generates a predetermined output voltage from a predetermined DC power supply; a clock generator that outputs a clock for operating the charge pump; a voltage monitoring unit that monitors the output voltage of the charge pump and controls the clock output from the clock generator such that the output voltage is maintained within a predetermined range; and a voltage regulator that generates a bias voltage from the output voltage of the charge pump. Therefore, this produces an effect of reducing the consumption current by maintaining the output voltage of the charge pump within the predetermined range.

Furthermore, in the first aspect, the charge pump may generate the output voltage of a predetermined negative potential from the DC power supply of a predetermined positive potential, and the voltage regulator may generate the bias voltage of the predetermined negative potential from the output voltage. In this case, it may be assumed that the bias voltage is a body bias voltage of the circuit due to the fully-depleted silicon on insulator (SOI) process.

Furthermore, in the first aspect, an output of the charge pump may be connected to a capacitor, and charges may be charged and discharged in the capacitor according to an operation of the charge pump. Therefore, this brings about an effect that power is supplied from the capacitor to the voltage regulator during a period in which the charge pump stops operating.

Furthermore, in the first aspect, the voltage monitoring unit may perform comparison with the output voltage with reference to one of a first potential or a second potential, and output a control signal that enables output of the clock when the output voltage goes beyond the reference one, perform the comparison with reference to the first potential when the control signal indicates invalidity of the clock, and perform the comparison with reference to the second potential when the control signal indicates validity of the clock. Therefore, this produces an effect of reducing the consumption current by maintaining the output voltage of the charge pump within a range between the first potential and the second potential.

Furthermore, in the first aspect, the voltage monitoring unit may stop the output of the clock when the output voltage falls below the second potential when the clock is being output, and may start the output of the clock when the output voltage goes beyond the first potential when the output of the clock is stopped.

Furthermore, in the first aspect, the voltage monitoring unit may perform the comparison with reference to the second potential when a predetermined forced signal is input even when the control signal indicates invalidity of the clock. Therefore, this brings about an effect of promoting the operation of the charge pump when the forced signal is input.

Note that, in the first aspect, for example, it is assumed that the first potential is −1.4 V and the second potential is −1.5 V. Therefore, this brings about an effect of suppressing the number of times of pumping and reducing power consumption.

MODE FOR CARRYING OUT THE INVENTION

The following describes modes for carrying out the present technology (hereinafter, referred to as embodiments). The description will be given in the following order.
1. First embodiment (an example of reducing the consumption current)
2. Second embodiment (an example of reducing radioactive noises)

1. First Embodiment

[Mobile Wireless Communication Chip]

Figure 1:
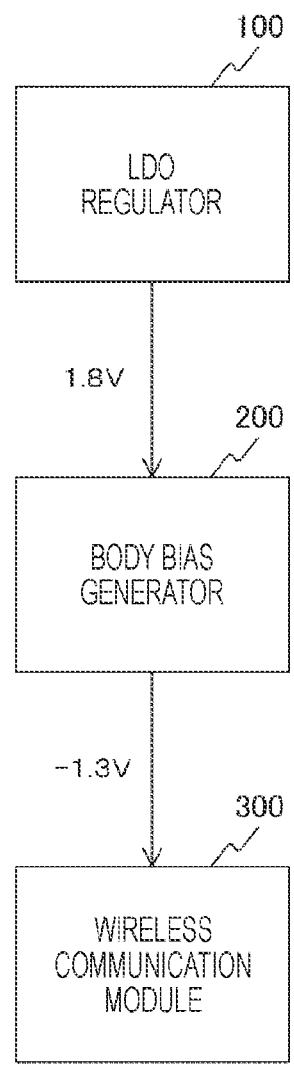
FIG. 1 is a diagram illustrating an example of a semiconductor device according to an embodiment of the present technology.

FIG. 1 is a diagram illustrating an example of a semiconductor device according to an embodiment of the present technology.

Here, a block configuration diagram of a mobile wireless communication chip is illustrated as an example of the semiconductor device. The mobile wireless communication chip includes an LDO regulator 100, the body bias generator 200, and a wireless communication module 300.

The low drop out (LDO) regulator 100 is a linear regulator for supplying power to the mobile wireless communication chip. In this example, it is assumed that the LDO regulator 100 supplies a power supply voltage of "−1.8 V".

The body bias generator 200 is a circuit that receives the power supply voltage from the LDO regulator 100 and generates the body bias voltage of the wireless communication module 300. The body bias generator 200 has a function as a direct current (DC)/DC converter in order to generate a DC body bias voltage from a DC power supply voltage. In other words, the body bias generator 200 is an example of a DC/DC converter described in the claims. Details of the body bias generator 200 will be described later.

The wireless communication module 300 is a communication module for performing communication that conforms to Bluetooth (registered trademark) Low Energy Standard (BLE communication). The BLE is a technology for transmitting data of a small size in a short distance to surroundings, and can perform wireless communication with low power consumption. The wireless communication module 300 operates by the body bias voltage supplied from the body bias generator 200.

It has been assumed that the wireless communication module 300 is the CMOS of the FD-SOI process, and the body bias voltage of the N-channel transistor can be made variable between "0 V" and "−1.3 V". Furthermore, the body bias voltage of the P-channel transistor can be made variable between "0 V" and "+1.3 V" in a similar manner. In this example, focusing on the N-channel transistor, it is assumed that the body bias generator 200 generates "−1.3 V" as a body bias voltage NBB of the N-channel transistor.

Note that, although the module of the BLE communication has been exemplified here, this is an example of application targets, and the embodiment of the present technology can be widely applied when generating the body bias voltage of another circuit.

[Body Bias Generator]

Figure 2:
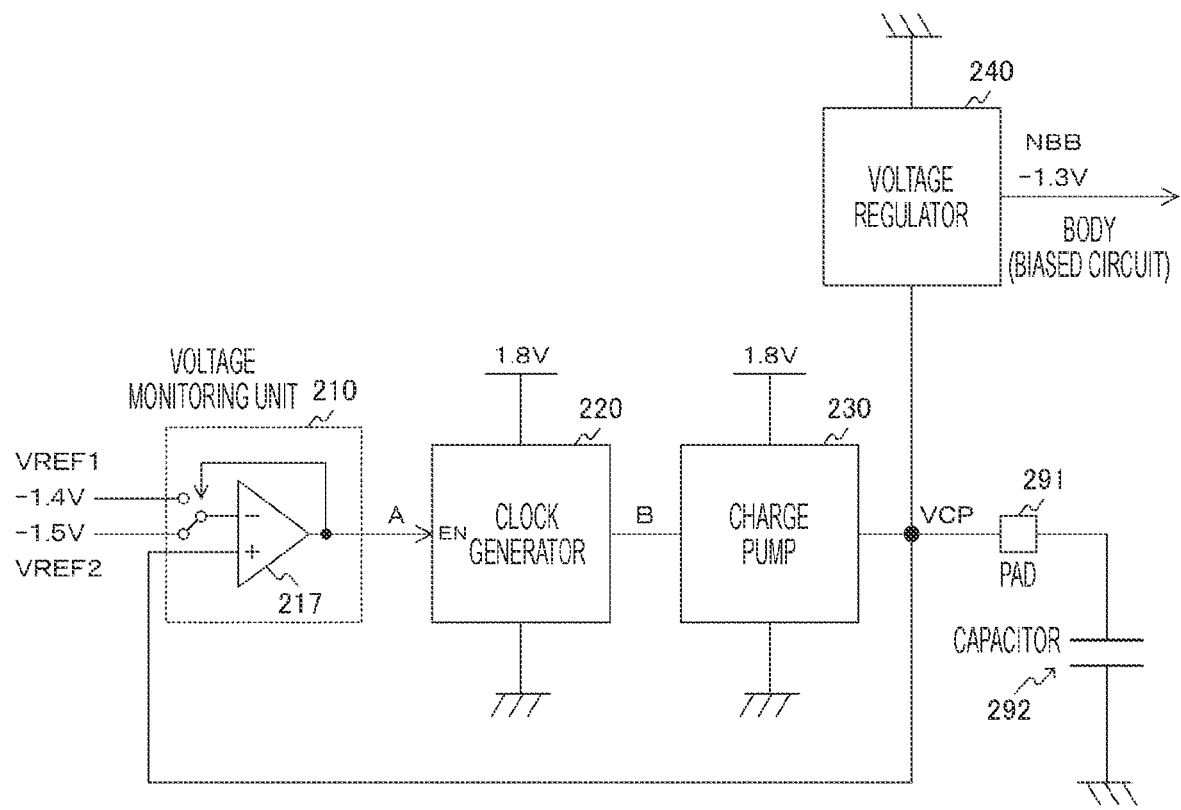
FIG. 2 is a diagram illustrating a block configuration example of a body bias generator 200 according to a first embodiment of the present technology.

FIG. 2 is a diagram illustrating a block configuration example of the body bias generator 200 according to the first embodiment of the present technology.

The body bias generator 200 includes a voltage monitoring unit 210, a clock generator 220, a charge pump 230, and a voltage regulator 240. Furthermore, a pad 291 is provided on way of the output of the charge pump 230. An external capacitor 292 is connected to the pad 291.

The voltage monitoring unit 210 is a circuit that monitors an output voltage VCP of the charge pump 230. The voltage monitoring unit 210 includes an operational amplifier 217. The operational amplifier 217 compares the output voltage VCP of the charge pump 230 with a reference voltage, and outputs a control signal A that enables the output of the clock from the clock generator 220 when the output voltage VCP goes beyond the reference voltage.

Here, in a case where the control signal A indicates invalidity, the voltage monitoring unit 210 compares the output voltage VCP with VREF1 which is the reference voltage as a benchmark. On the other hand, in a case where the control signal A indicates validity, the voltage monitoring unit 210 compares the output voltage VCP with VREF2 which is the reference voltage as a benchmark. In this example, it is assumed that VREF1 is "−1.4 V" and VREF2 is "−1.5 V". In other words, the operational amplifier 217 that performs such operation can be realized as, for example, a hysteresis comparator.

The clock generator 220 is a circuit that generates a clock signal B in accordance with the control signal A from the voltage monitoring unit 210. In other words, in a case where the control signal A indicates validity of a clock output, the clock generator 220 generates the clock signal B. On the other hand, in a case where the control signal A indicates invalidity of the clock output, the clock generator 220 does not generate the clock signal B.

The charge pump 230 is a circuit that charges and discharges the capacitor 292 by the DC power supply from the LDO regulator 100 according to the clock signal B from the clock generator 220. The output voltage VCP of the charge pump 230 is applied to the capacitor 292. When the clock signal B is output from the clock generator 220, the charges are charged in the capacitor 292. On the other hand, when the clock signal B is not output from the clock generator 220, the charges charged in the capacitor 292 are discharged.

The voltage regulator 240 generates the body bias voltage NBB from the output voltage VCP of the charge pump 230. The voltage regulator 240 includes, for example, a digital-to-analog converter (DAC).

Figure 3:
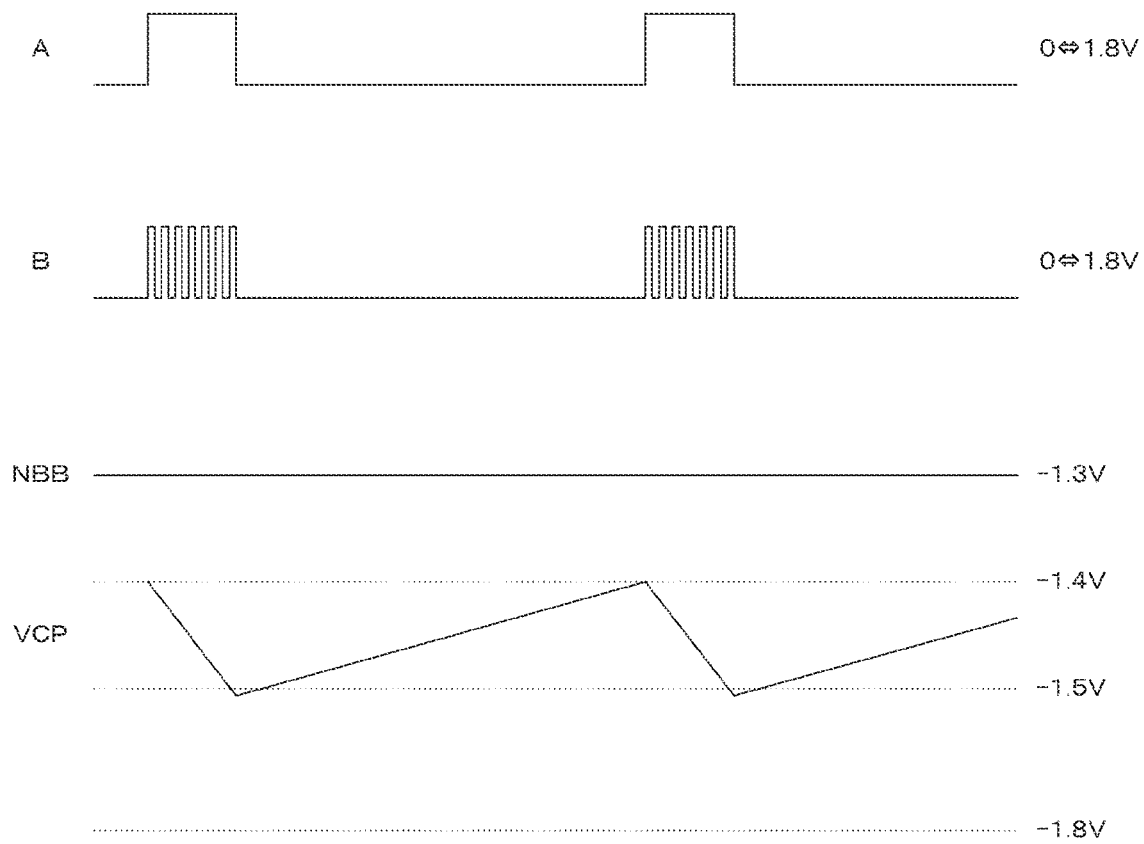
FIG. 3 is a diagram illustrating an example of operation timing of the body bias generator 200 according to the first embodiment of the present technology.

FIG. 3 is a diagram illustrating an example of operation timing of the body bias generator 200 according to the first embodiment of the present technology.

At the time of initial startup, the output voltage VCP of the charge pump 230 is "0 V". By causing the clock generator 220 to generate the clock signal B, the charge pump 230 is driven, the capacitor 292 is charged, and the output voltage VCP of the charge pump 230 decreases in a direction of the negative potential.

At this time, since the control signal A indicates validity of the clock output, the voltage monitoring unit 210 compares VREF2 (−1.5 V) which is the reference voltage as a benchmark with the output voltage VCP. Therefore, when the output voltage VCP falls below VREF2 (−1.5 V), the control signal A indicates invalidity of the clock output, and the clock generator 220 no longer generates the clock signal B. While the clock signal B is stopped, the charges are discharged according to the relationship between the charges charged in the capacitor 292 and a load current. Therefore, the output voltage VCP of the charge pump 230 transitions from VREF2 (−1.5 V) toward VREF1 (−1.4 V).

At this time, since the control signal A indicates invalidity of the clock output, the voltage monitoring unit 210 compares VREF1 (−1.4 V) which is the reference voltage as a benchmark with the output voltage VCP. Therefore, when the output voltage VCP of the charge pump 230 goes beyond VREF1 (−1.4 V) due to the discharge of the charges of the capacitor 292, the control signal A indicates validity of the clock output, the clock generator 220 generates the clock signal B, and the capacitor 292 is charged with the charges by the operation of the charge pump 230.

Then, the similar operation is repeated. As a result, the output voltage VCP of the charge pump 230 is controlled to be maintained within a range of VREF1 (−1.4 V) to VREF2 (−1.5 V).

[Charge Pump]

Figure 4:
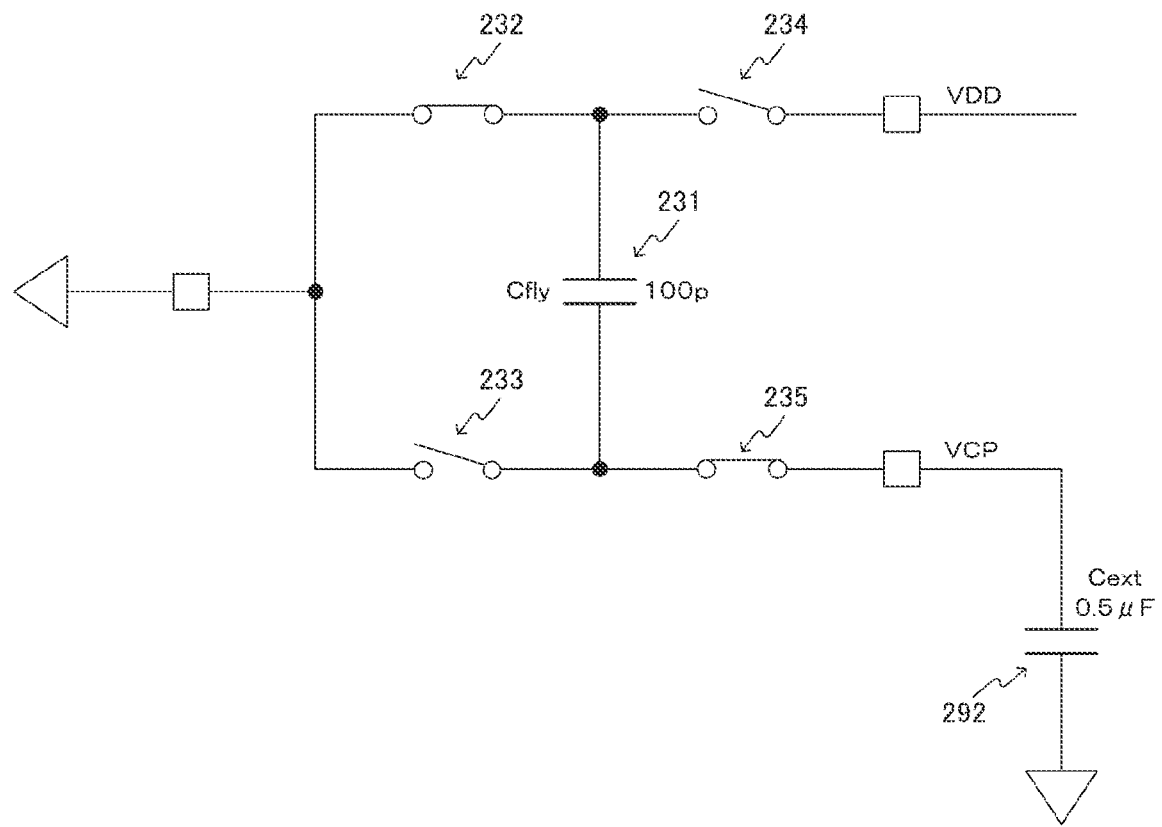
FIG. 4 is a diagram illustrating a circuit configuration example of a charge pump 230 according to an embodiment of the present technology.

FIG. 4 is a diagram illustrating a circuit configuration example of the charge pump 230 according to embodiments of the present technology.

The charge pump 230 includes a flying capacitor (Cfly) 231 and four switches 232 to 235. One ends of the switches 232 and 234 are connected to one end of the flying capacitor 231. One ends of the switches 233 and 235 are connected to the other end of the flying capacitor 231. The other ends of the switches 232 and 233 are grounded to a power supply level. The other end of the switch 234 is connected to a power supply potential VDD (1.8 V). The other end of the switch 235 is connected to one end of the capacitor 292 as the output voltage VCP of the charge pump 230.

The switches 232 to 235 are driven to be turned on or off by the clock signal B from the clock generator 220. In other words, when the clock indicates "0", the switches 233 and 234 are turned on, the switches 232 and 235 are turned off, and the flying capacitor 231 is charged by the power supply potential VDD (1.8 V). On the other hand, when the clock indicates "0", the switches 233 and 234 are turned off, the switches 232 and 235 are turned on, the charges charged in the flying capacitor 231 are discharged, and the capacitor 292 is charged with the charges.

Figure 5:
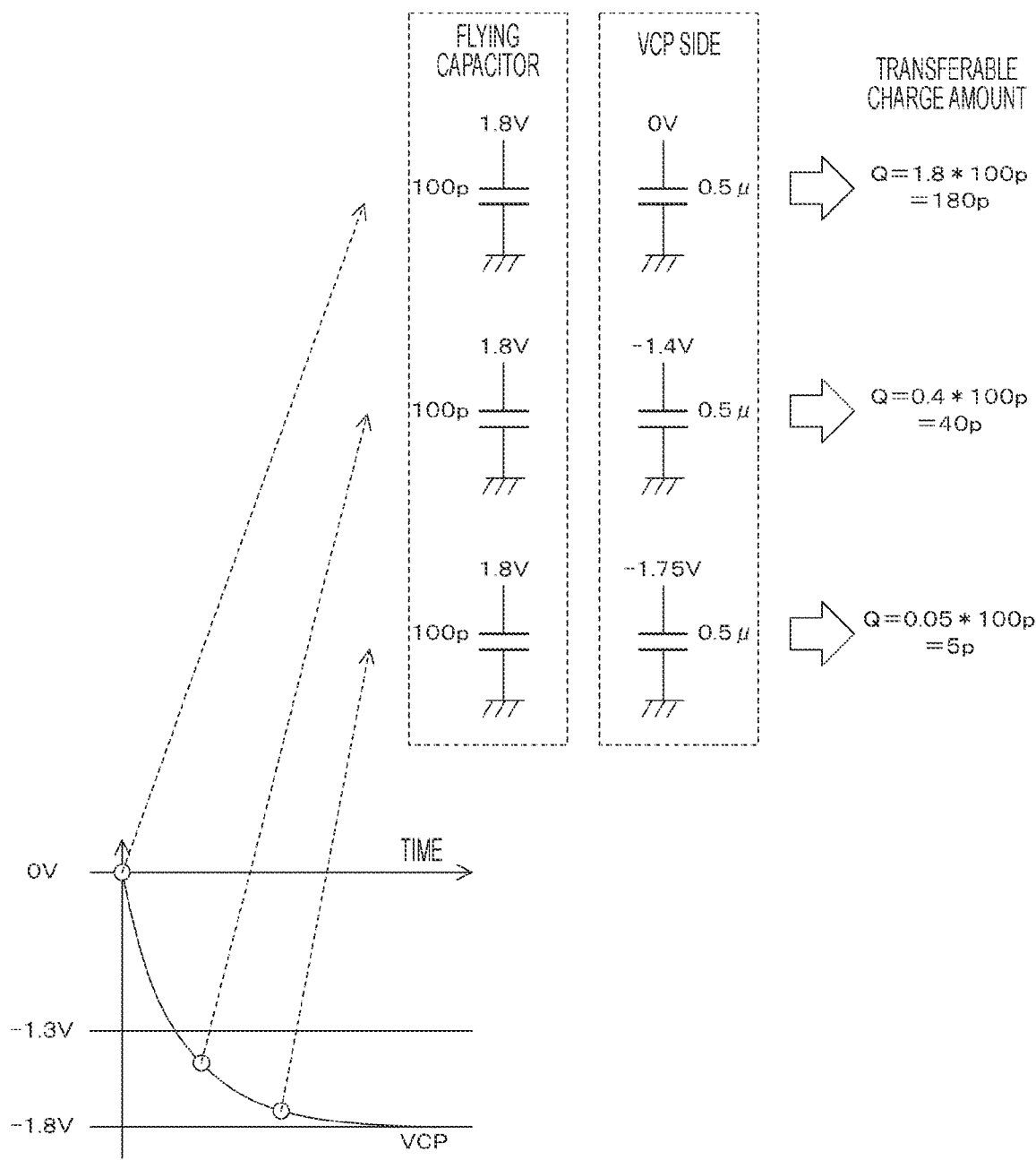
FIG. 5 is a diagram illustrating a calculation example of a transferable charge amount of the charge pump 230 according to an embodiment of the present technology.

FIG. 5 is a diagram illustrating a calculation example of a transferable charge amount of the charge pump 230 according to the embodiments of the present technology.

In general, a curve of activation profile is as shown in the diagram when the negative power supply is generated by using a charge pump with a 1.8 V power supply. In this curve, the closer the output voltage VCP is to "−1.8 V", the smoother the curve change is. This is because there is a relationship between the 1.8 V power supply and level of the output voltage VCP.

This is a motion in which the charges charged between a positive power supply (1.8 V) and VSS in the flying capacitor Cfly are transferred to the negative power supply of the output voltage VCP. The charge amount AQ that can be transferred at a time is expressed by the following equation.

$$\Delta Q = Cfly * \Delta V = Cfly * (\text{positive power supply} + VCP)$$

For example, in a case where the positive power supply is "1.8 V" and Cfly is 100 pF, the charge amount that can be transferred according to the level of the output voltage VCP is calculated as follows.

In a case where VCP=0 V:

$$\Delta Q = 100 \text{ pF} * (1.8 \text{ V} - 0 \text{ V}) = 180 \, p[q]$$

In a case where VCP=−1.4 V:

$$\Delta Q = 100 \text{ pF} * (1.8 \text{ V} - 1.4 \text{ V}) = 40 \, p[q]$$

In a case where VCP=−1.75 V:

$$\Delta Q = 100 \text{ pF} * (1.8 \text{ V} - 1.75 \text{ V}) = 5 \, p[q]$$

When comparing the charge transfer amounts in a case where the level of the output voltage VCP is "−1.4 V" and in a case where the level of the output voltage VCP is "−1.75 V", the former can transfer 8 times more charges. In other words, even in a case where the current (charges) consumed from the output voltage VCP is constant, the number of times of pumping (frequency) greatly varies depending on the level of the output voltage VCP.

The consumption current of the charge pump is zero in a case where the charge pump is configured by an ideal switch, but actually, the switch has a parasitic capacitance, and furthermore, a buffer or the like for driving the switch consumes power resultingly. In other words, the power consumption of the charge pump is proportional to the number of times of pumping (frequency). In order to reduce the power consumption of the charge pump, keeping the number of times of pumping low is considered to be an effective approach.

Therefore, in this embodiment, the output voltage VCP of the charge pump 230 is controlled to be maintained within a range of "−1.4 V" to "−1.5 V", such that the number of times of pumping is suppressed to be low to reduce the power consumption of the charge pump.

[Circuit Configuration of Body Bias Generator]

Figure 6:
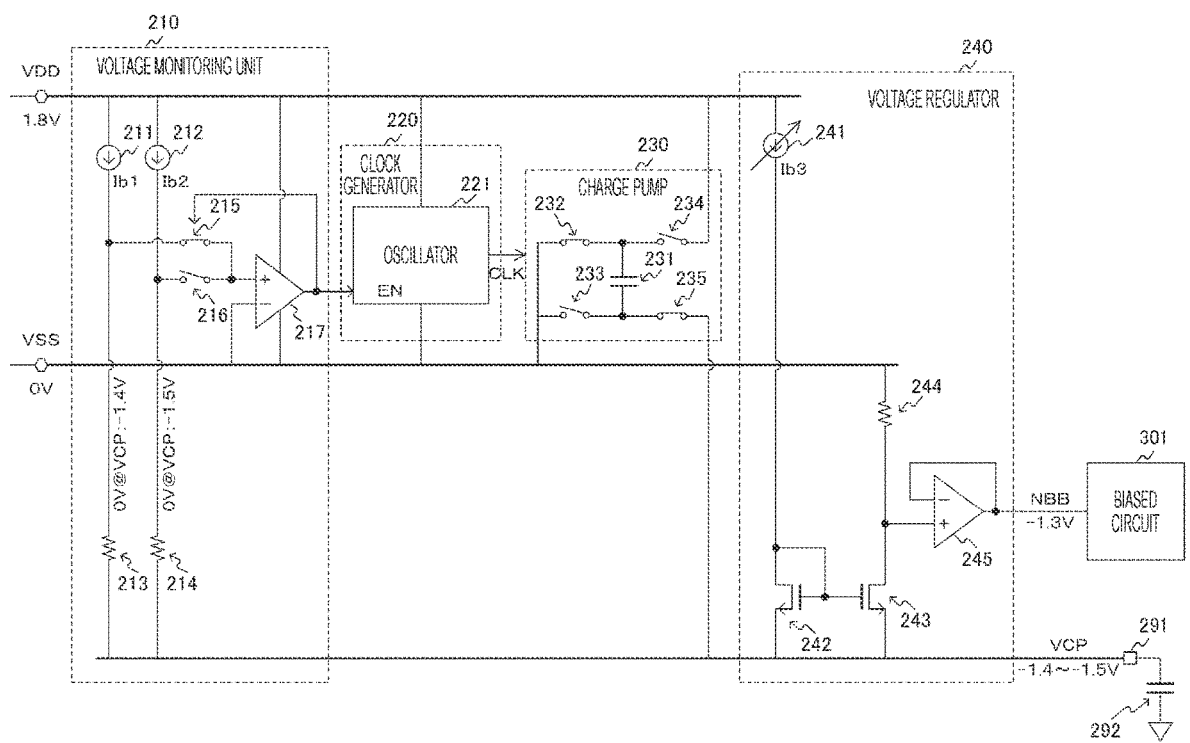
FIG. 6 is a diagram illustrating a circuit configuration example of the body bias generator 200 according to the first embodiment of the present technology.

FIG. 6 is a diagram illustrating a circuit configuration example of the body bias generator 200 according to the first embodiment of the present technology. The block configuration of the body bias generator 200 is as described above.

The voltage monitoring unit 210 includes current sources 211 and 212, resistors 213 and 214, switches 215 and 216, and an operational amplifier 217. A current from the current source 211 flows through the resistor 213, and a potential indicating "0 V" when the output voltage VCP is "−1.4 V" is supplied to one end of the switch 215. A current from the current source 212 flows through the resistor 214, and a potential indicating "0 V" when the output voltage VCP is "−1.5 V" is supplied to one end of the switch 216. One of the switches 215 and 216 is turned on and the other is turned off according to the output of the operational amplifier 217. The operational amplifier 217 compares the potential supplied from either of the switches 215 and 216 with "0 V" of VSS, and outputs the control signal A that enables the output of the clock from the clock generator 220 when the output voltage VCP goes beyond the reference voltage (−1.4 V or −1.5 V).

The clock generator 220 includes an oscillator 221. The oscillator 221 inputs the control signal A from the voltage monitoring unit 210 to an enable terminal EN, and outputs the clock signal B from a CLK terminal. In other words, in a case where the control signal A indicates validity of the clock output, the oscillator 221 generates the clock signal B. On the other hand, in a case where the control signal A indicates invalidity of the clock output, the oscillator 221 does not generate the clock signal B.

As described above, the charge pump 230 includes the flying capacitor 231 and the four switches 232 to 235. The output of the charge pump 230 is connected to the pad 291 as described above. An external capacitor 292 is connected to the pad 291. Since the operation of the charge pump 230 is as described above, a detailed description thereof will be omitted here.

The voltage regulator 240 includes a current source 241, MOS transistors 242 and 243, a resistor 244, and an operational amplifier 245. The current source 241 and the MOS transistors 242 and 243 constitute a current mirror circuit, and supply a current Ib3 of the current source 241 to the operational amplifier 245. The operational amplifier 245 generates the body bias voltage NBB (−1.3 V) from the current Ib3 with reference to VSS (0 V). The body bias voltage NBB is supplied to a biased circuit 301.

As described above, in the first embodiment of the present technology, the voltage monitoring unit 210 monitors the output voltage VCP of the charge pump 230 in the body bias generator 200, and controls the output voltage VCP to be maintained within the range of VREF1 to VREF2. As a result, the charge transfer amount of the charge pump 230 at a time can be increased and the pumping frequency can be reduced, such that the power consumption can be reduced.

2. Second Embodiment

In the body bias generator 200, since the charge pump 230 rapidly charges and discharges the charges with respect to the capacitor 292, a magnetic field is generated. In the assumption of the mobile wireless communication chip, then there is a possibility that a reception path of a wireless signal may pick up the magnetic field as a noise. Furthermore, in a case where the charge pump 230 operates, ripples may occur in the output voltage VCP, then there is a possibility that the ripples may propagate to the body of the wireless communication module 300 via the voltage regulator 240.

Therefore, in the Second Embodiment, in Order to Reduce such radioactive noises, a function of stopping the charge pump 230 during wireless communication is provided. Note that, in a case where the charge pump 230 is stopped, power supply during that time is power supply from the charges charged in the external capacitor 292. Therefore, if the output voltage VCP stops for a long period of time, the level of the output voltage VCP becomes 0 V resultingly. On the other hand, in the BLE communication, transmission and reception are repeatedly performed, and an interval section exists therebetween. Therefore, the operation as the system is secured by operating and recharging the charge pump 230 in the interval section.

[Body Bias Generator]

Figure 7:
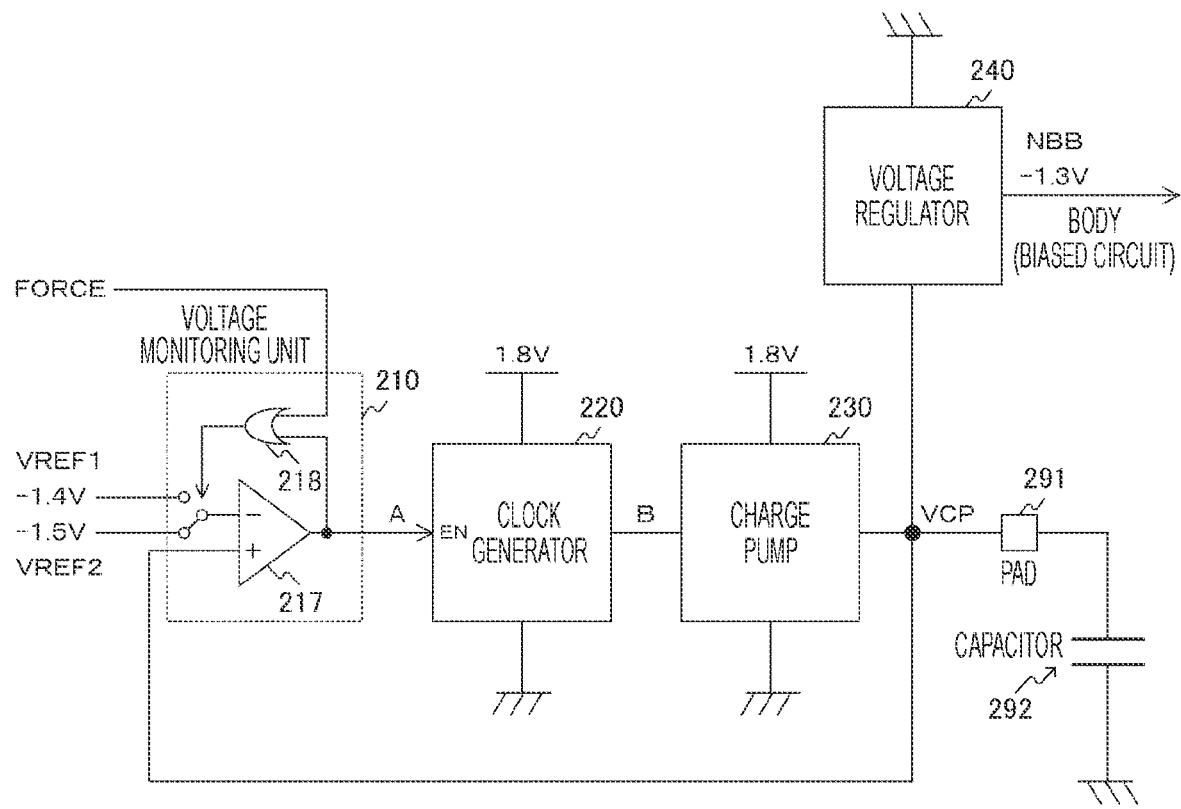
FIG. 7 is a diagram illustrating a block configuration example of a body bias generator 200 according to a second embodiment of the present technology.

FIG. 7 is a diagram illustrating a block configuration example of the body bias generator 200 according to the second embodiment of the present technology.

The configuration of the body bias generator 200 in the second embodiment is basically similar to that of the above-described first embodiment. However, the second embodiment is different from the first embodiment in that the voltage monitoring unit 210 further includes an OR circuit 218. The OR circuit 218 generates an OR of the control signal A from the operational amplifier 217 and the forced signal FORCE which is external, and supplies the generated OR to the switches 215 and 216 that select the reference voltage.

The forced signal FORCE is a signal indicating that the wireless communication is not being performed (a non-communication state), and is a control signal generated by core logic of the mobile wireless communication chip or the like. In the first embodiment described above, when the control signal A indicates invalidity of the clock, comparison with the output voltage VCP of the charge pump 230 is performed with reference to VREF1, and when the control signal A indicates validity of the clock, comparison is performed with reference to VREF2. In the second embodiment, even when the control signal A indicates invalidity of the clock, comparison is performed with reference to VREF2 when the forced signal FORCE indicates the non-communication state.

Therefore, in the non-communication state, at a stage where the output voltage VCP goes beyond VREF2 (−1.5 V) due to discharge of the capacitor 292, the clock from the clock generator 220 is enabled to operate the charge pump 230, and the capacitor 292 is charged with charges. In other words, by actively performing charging in the non-communication state, the operation of the charge pump 230 during the wireless communication can be suppressed.

Figure 8:
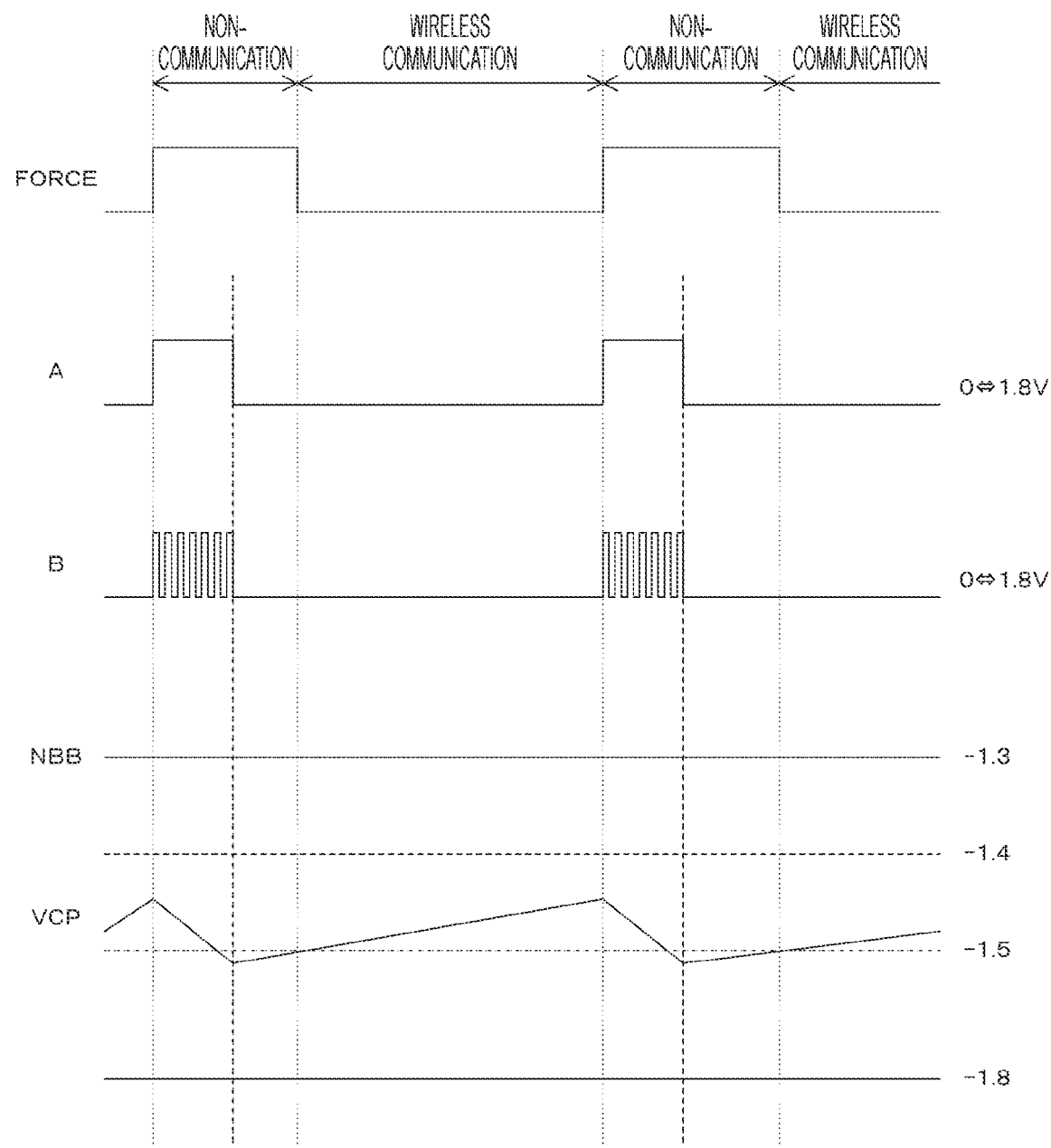
FIG. 8 is a diagram illustrating a first example of operation timing of the body bias generator 200 according to the second embodiment of the present technology.

FIG. 8 is a diagram illustrating the first example of operation timing of the body bias generator 200 according to the second embodiment of the present technology.

In the second embodiment, in addition to the first embodiment described above, a viewpoint of whether or not the wireless communication is being performed is added. In other words, when the forced signal FORCE indicates "H" (the non-communication state), a negative feedback is applied such that the output voltage VCP of the charge pump 230 becomes "−1.5 V".

During the wireless communication, the forced signal FORCE becomes "L". At that time, when the output voltage VCP falls below "−1.4 V", the clock is stopped and power is supplied (discharged) from the capacitor 292.

Here, in order to realize these operations, it is necessary to design such that the following conditions are satisfied. Note that Q1 is the amount of charges to be charged during a period in which the forced signal FORCE indicates the non-communication state, and Q2 is the amount of charges to be discharged from the capacitor 292 during a period in which the forced signal FORCE indicates that the wireless communication is being performed.

$$Q1 > Q2$$

Note that, in the first example, the case where the period during which the forced signal FORCE indicates the non-communication state is short has been described. In a case where the period during which the forced signal FORCE indicates the non-communication state is long, the reference voltage serving as a benchmark by the voltage monitoring unit 210 is fixed to "−1.5 V" as in a second example below, and thus the output voltage VCP continues to output "−1.5 V" with a negative feedback loop.

Figure 9:
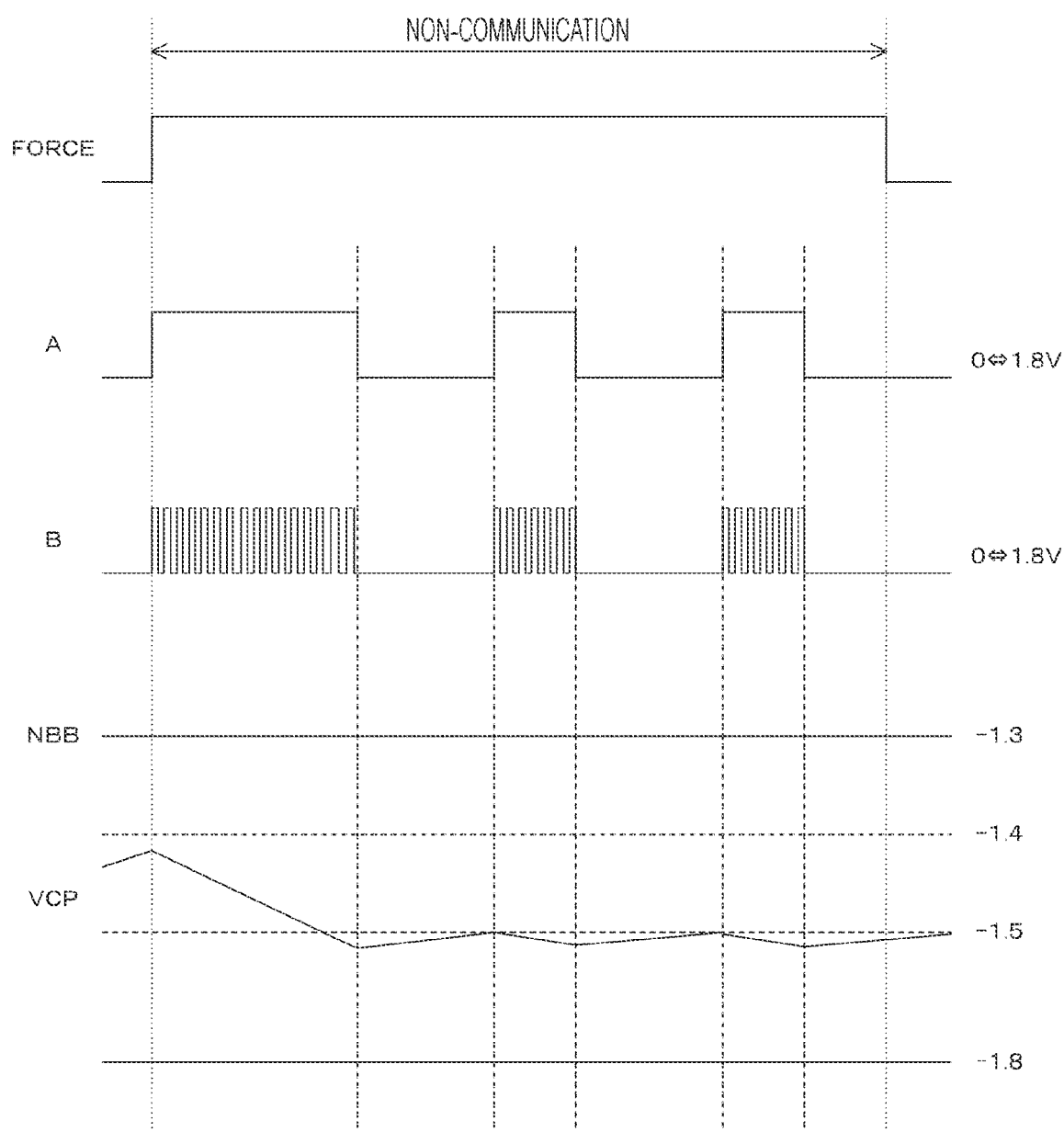
FIG. 9 is a diagram illustrating another example of operation timing of the body bias generator 200 according to the second embodiment of the present technology.

FIG. 9 is a diagram illustrating another example of operation timing of the body bias generator 200 according to the second embodiment of the present technology. This example shows details of transition of the output voltage VCP of the charge pump 230 in the non-communication state.

During the wireless communication, when the control signal A indicates invalidity of the clock, the clock restarts in a state in which the discharge progresses until the output voltage VCP goes beyond "−1.4 V", but in the non-communication state, the clock restarts when the output voltage VCP goes beyond "−1.5 V". When the clock is input, the charge pump 230 operates and the charges are charged in the capacitor 292. When charging progresses and the output voltage VCP falls below "−1.5 V", the clock stops. By repeating this, the output voltage VCP is maintained at "−1.5 V" in the non-communication state.

[Circuit Configuration of Body Bias Generator]

Figure 10:
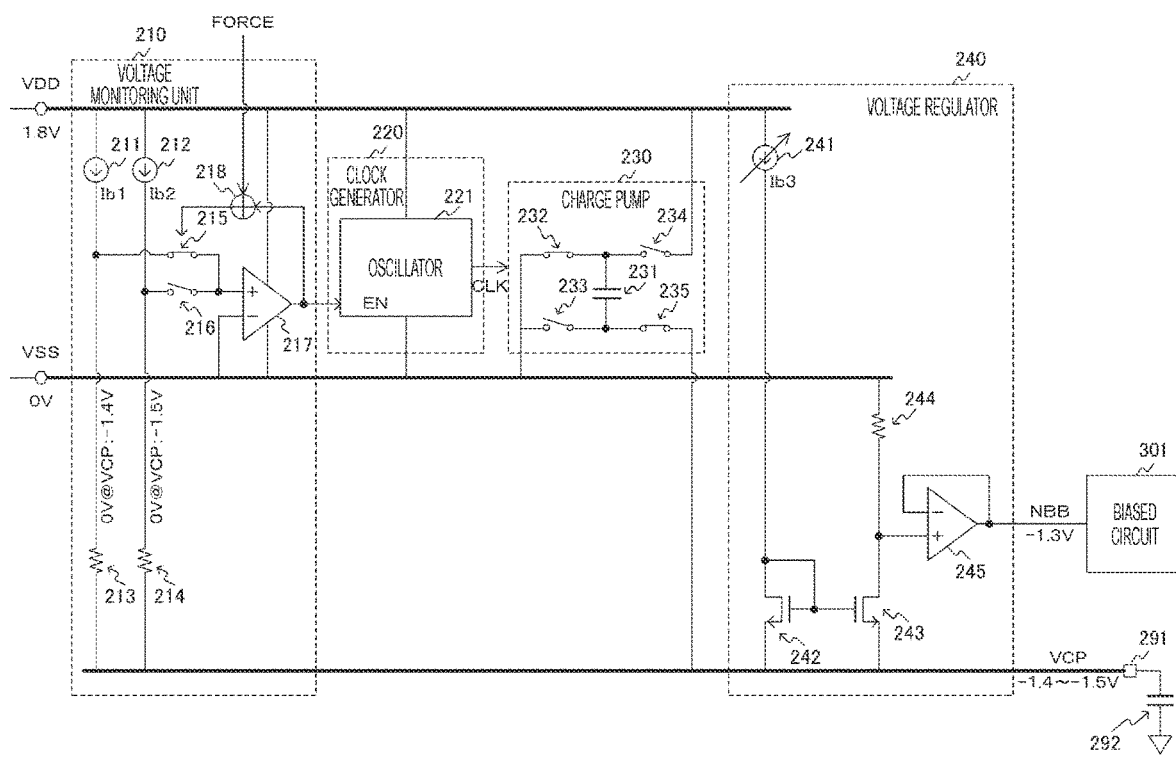
FIG. 10 is a diagram illustrating a circuit configuration example of the body bias generator 200 according to the second embodiment of the present technology.

FIG. 10 is a diagram illustrating a circuit configuration example of the body bias generator 200 according to the second embodiment of the present technology.

The circuit configuration of the body bias generator 200 in the second embodiment is basically similar to that of the first embodiment described above. However, as described above, the second embodiment is different from the first embodiment in that the voltage monitoring unit 210 further includes the OR circuit 218.

Accordingly, in the second embodiment of the present technology, the OR circuit 218 generates the OR of the control signal A from the operational amplifier 217 and the forced signal FORCE, and uses the generated OR as a selection signal of the reference voltage of the operational amplifier 217. In other words, during the period in which the forced signal FORCE indicates the non-communication state, the output voltage VCP is maintained at "−1.5 V", and the charge pump 230 is actively operated to charge the capacitor 292 with charges. Therefore, the operation of the charge pump 230 during the wireless communication is suppressed, the generation of the radioactive noises is reduced, and the body bias voltage can be generated without affecting transmission/reception characteristics of the wireless communication.

Note that, the embodiments described above illustrate an example for embodying the present technology, and the matters in the embodiments and the matters specifying the invention in the claims have a correspondence relationship. Similarly, the matters specifying the invention in the claims and the matters in the embodiments of the present technology denoted by the same names as the matters specifying the invention have a correspondence relationship. However, the present technology is not limited to the embodiments, and can be embodied by making various modifications to the embodiments without departing from the gist thereof.

Note that, the effects described in the present description are merely examples and are not limited, and furthermore, other effects may be provided.

Note that, the present technology can also have the following configurations.

(1) A DC/DC converter including:

a charge pump that generates a predetermined output voltage from a predetermined DC power supply;

a clock generator that outputs a clock for operating the charge pump;

a voltage monitoring unit that monitors the output voltage of the charge pump and controls the clock output from the clock generator such that the output voltage is maintained within a predetermined range; and a voltage regulator that generates a bias voltage from the output voltage of the charge pump.

(2) The DC/DC converter according to (1), in which the charge pump generates the output voltage having a predetermined negative potential from the DC power supply having a predetermined positive potential, and the voltage regulator generates the bias voltage of a predetermined negative potential from the output voltage.

(3) The DC/DC converter according to (2), in which the bias voltage is a body bias voltage of a circuit according to a fully-depleted silicon on insulator (SOI) process.

(4) The DC/DC converter according to any one of (1) to (3), in which an output of the charge pump is connected to a capacitor, and charges are charged and discharged in the capacitor in response to an operation of the charge pump.

(5) The DC/DC converter according to any one of (1) to (4), in which the voltage monitoring unit performs comparison with the output voltage with reference to either one of a first potential and a second potential, and outputs a control signal that enables output of the clock when the output voltage goes beyond the reference one, performs the comparison with reference to the first potential when the control signal indicates invalidity of the clock, and performs the comparison with reference to the second potential when the control signal indicates validity of the clock.

(6) The DC/DC converter according to (5), in which the voltage monitoring unit stops the output of the clock when the output voltage falls below the second potential while the clock is being output, and starts the output of the clock when the output voltage goes beyond the first potential while the output of the clock is stopped.

(7) The DC/DC converter according to (5), in which the voltage monitoring unit performs the comparison with reference to the second potential when a predetermined forced signal is input even in a case where the control signal indicates invalidity of the clock.

(8) The DC/DC converter according to any one of (5) to (7), in which the first potential is −1.4 V and the second potential is −1.5 V.

REFERENCE SIGNS LIST

100 LDO regulator
200 Body bias generator
210 Voltage monitoring unit
211, 212 Current source
213, 214 Resistor
215, 216 Switch
217 Operational amplifier
218 OR circuit
220 Clock generator
221 Oscillator
230 Charge pump
231 Flying capacitor
232 to 235 Switch
240 Voltage regulator
241 Current source 242, 243 MOS transistor
244 Resistor
245 Operational amplifier
291 Pad
292 Capacitor
300 Wireless communication module
301 Biased circuit

The invention claimed is:

1. A DC/DC converter, comprising:
a charge pump configured to generate a specific output voltage from a specific DC power supply;
a clock generator configured to output a clock for operating the charge pump;
a voltage monitoring unit configured to:
monitor the specific output voltage of the charge pump; and
control the clock output from the clock generator such that the specific output voltage is maintained within a specific range;
compare the specific output voltage with one of a first potential or a second potential;
output a control signal that enables output of the clock when the specific output voltage goes beyond one of the first potential or the second potential:
compare the specific output voltage with the first potential when the control signal indicates invalidity of the clock;
compare the specific output voltage with the second potential when the control signal indicates validity of the clock; and
compare the specific output voltage with the second potential when a specific forced signal is input even in a case where the control signal indicates invalidity of the clock; and
a voltage regulator configured to generate a bias voltage from the specific output voltage of the charge pump.

2. The DC/DC converter according to claim 1, wherein
the charge pump is further configured to generate the specific output voltage having a specific negative potential from the specific DC power supply having a specific positive potential, and
the voltage regulator is further configured to generate the bias voltage of a specific negative potential from the specific output voltage.

3. The DC/DC converter according to claim 2, wherein the bias voltage is a body bias voltage of a circuit that is a CMOS of a fully-depleted silicon on insulator (SOI) process.

4. The DC/DC converter according to claim 1, wherein
an output of the charge pump is connected to a capacitor, and
charges are charged and discharged in the capacitor in response to an operation of the charge pump.

5. The DC/DC converter according to claim 1, wherein the first potential is −1.4 V and the second potential is −1.5 V.

* * * * *